(12) United States Patent
Kurahashi

(10) Patent No.: US 6,933,635 B2
(45) Date of Patent: Aug. 23, 2005

(54) AUTOMOTIVE ALTERNATOR

(75) Inventor: Takaaki Kurahashi, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/819,118

(22) Filed: Apr. 7, 2004

(65) Prior Publication Data

US 2004/0201294 A1 Oct. 14, 2004

(30) Foreign Application Priority Data

Apr. 8, 2003 (JP) ....................................... 2003-103592

(51) Int. Cl.⁷ .................................................. H02K 1/32
(52) U.S. Cl. ..................................... 310/68 D; 310/64
(58) Field of Search .................... 310/68 D, 52–64; 363/141, 144, 145

(56) References Cited

U.S. PATENT DOCUMENTS

| | | | |
|---|---|---|---|
| 4,419,597 A | * 12/1983 | Shiga et al. | 310/68 D |
| 4,926,076 A | * 5/1990 | Nimura et al. | 310/68 D |
| 6,184,602 B1 | * 2/2001 | Ooiwa et al. | 310/68 D |
| 6,198,188 B1 | 3/2001 | Ihata | 310/68 D |
| 6,724,108 B2 | * 4/2004 | Nakano | 310/68 D |
| 6,812,604 B2 | * 11/2004 | Braun et al. | 310/68 D |

FOREIGN PATENT DOCUMENTS

JP          A 2000-253625          9/2000

* cited by examiner

*Primary Examiner*—Dang Le
(74) *Attorney, Agent, or Firm*—Oliff & Berridge, PLC

(57) ABSTRACT

A rectifying unit has two heat radiation fins to which positive-electrode side and negative-electrode side rectifying elements are fixed respectively. A terminal platform having a connecting terminal provides wiring for the positive-electrode side rectifying element and the negative-electrode side rectifying element. Two heat radiation fins are disposed in a radial direction with respect to a rotary shaft of the rotor. The negative-electrode side heat radiation fin is interposed between the frame and the positive-electrode side heat radiation fin, and is partly overlapped with the positive-electrode side heat radiation fin in the direction of the rotary shaft. An inner radius of the negative-electrode side heat radiation fin is smaller than an outer radius of the cooling air inlet window.

7 Claims, 6 Drawing Sheets

AUTOMOTIVE ALTERNATOR

BACKGROUND OF THE INVENTION

The present invention relates to an alternator installed on an automotive vehicle or a truck (i.e. automotive alternating-current generator).

Many automotive vehicles employ a slant nose style to reduce the aerodynamic resistance and improve traveling performance. The automotive engines are equipped with various devices. The number of such engine accessories is recently increasing. On the other hand, the passenger compartment of an automotive vehicle needs to be wide or high enough to provide a satisfactory and comfortable space for the driver and other passengers. From these factors, the available space for an alternator in the engine room is very narrow. In other words, the ambient temperature of an automotive alternator tends to be high. Meanwhile, the power generation ability of each automotive alternator must be high to provide sufficient electric power to various electric devices installed on the vehicle. Thus, the heat generation of an automotive alternator is increasing. From the above circumstances, it is necessary to improve the cooling properties of a rectifying unit that includes a rectifying element, preferably at a lower cost, because the rectifying element causes a large temperature increase compared with other constituent parts of the automotive alternator.

The rectifying unit of an automotive alternator includes a positive-electrode side heat radiation fin to which a positive-electrode side rectifying element is fixed and a negative-electrode side heat radiation fin to which a negative-electrode side rectifying element is fixed. The positive-electrode side heat radiation fin and the negative-electrode side heat radiation fin are laminated in an axial direction via a terminal platform embedding connecting terminals. Furthermore, the negative-electrode side heat radiation fin is directly fixed to an end surface of a frame by means of a screw, as disclosed in the Japanese Patent Application Laid-open No. 2000-253625 (pages 3–6 and FIG. 1–13) corresponding to the U.S. Pat. No. 6,198,188.

However, according to the above-described conventional rectifying unit, a large amount of heat will transfer from a stator via the frame to the negative-electrode side heat radiation fin because the negative-electrode side heat radiation fin is directly fixed to the end surface of the frame by means of screws. The cooling air entering from its rear cover tends to be blocked by the positive-electrode side heat radiation fin. Thus, almost all of the introduced cooling air cannot be effectively used for cooling the negative-electrode side heat radiation fin. Accordingly, the negative-electrode side heat radiation fin has poor cooling properties.

SUMMARY OF THE INVENTION

In view of the above-described problems, the present invention has an object to provide an automotive alternator equipped with a rectifying unit having excellent cooling properties.

In order to accomplish the above and other related objects, the present invention provides an automotive alternator including a rotor, a stator disposed in an opposed relationship with the rotor, a frame supporting the rotor and the stator, a rectifying unit converting an alternating-current output of the stator into a direct-current output, a rear cover disposed outside the frame so as to cover the rectifying unit, and a cooling fan introducing cooling air from the outside into an inside space of the frame via the rear cover, the rectifying unit, and a cooling air inlet window of the frame. The rectifying unit has a positive-electrode side heat radiation fin to which a positive-electrode side rectifying element is fixed, a negative-electrode side heat radiation fin to which a negative-electrode side rectifying element is fixed, and a terminal platform having a connecting terminal providing wiring for the positive-electrode side rectifying element and the negative-electrode side rectifying element. The positive-electrode side heat radiation fin and the negative-electrode side heat radiation fin are disposed in a radial direction with respect to a rotary shaft of the rotor. The negative-electrode side heat radiation fin is interposed between the frame and the positive-electrode side heat radiation fin and is partly overlapped with the positive-electrode side heat radiation fin in the direction of the rotary shaft. And, the negative-electrode side heat radiation fin has an inner radius smaller than an outer radius of the cooling air inlet window.

Forming the negative-electrode side heat radiation fin covering the cooling air inlet window of the frame can enlarge the heat radiation area of the negative-electrode side heat radiation fin. The cooling air entering from the rear cover can surely cool the negative-electrode side heat radiation fin covering the cooling air inlet window. As a result, the cooling properties of the rectifying unit can be improved.

Furthermore, it is preferable that the negative-electrode side heat radiation fin has a projected portion formed along the rotary shaft of the rotor at a position corresponding to the cooling air inlet window so as to protrude toward an inner side in the radial direction, and an inner radius of the projected portion is smaller than the outer radius of the cooling air inlet window. Forming the projected portion at the portion corresponding to the cooling air inlet window of the frame substantially extends the negative-electrode side heat radiation fin toward the inner side in the radial direction. Thus, the cooling properties of the rectifying unit can be adequately maintained and effectively prevented from being worsened by the increase of air flow resistance.

Furthermore, it is preferable that the negative-electrode side heat radiation fin is brought into contact with and fixed to the frame via a fixing portion being partly provided, and the negative-electrode side heat radiation fin is spaced from the frame except for a portion corresponding to the fixing portion. According to this arrangement, the negative-electrode side heat radiation fin except for the fixing portion can be positioned far from the frame receiving the heat of the stator. Thus, the cooling properties of the rectifying unit can be adequately maintained and effectively prevented from being worsened by the heat conductance from the frame.

Furthermore, it is preferable that the inner radius of the negative-electrode side heat radiation fin being set to be smaller than the outer radius of the cooling air inlet window is smaller than the radius of a central position of the cooling air inlet window in a radial direction.

Widening the area of the negative-electrode side heat radiation fin so as to cover the cooling air inlet window can ensure the effects of improving the cooling properties.

Furthermore, it is preferable that the negative-electrode side heat radiation fin has through-holes formed along the rotary shaft of the rotor so as to correspond to the cooling air inlet window. Alternatively, it is preferable that the negative-electrode side heat radiation fin has an inner circumferential edge configured into corrugated portions positioned along the rotary shaft of the rotor so as to correspond to the cooling air inlet window. This arrangement can increase the heat radiation area of the negative-electrode side heat radiation fin and reduce the air flow resistance. Thus, the cooling properties of the rectifying unit can be further improved.

Furthermore, it is preferable that the positive-electrode side heat radiation fin has through-holes positioned along the rotary shaft of the rotor so as to correspond to both of the cooling air inlet window and the negative-electrode side heat radiation fin. This arrangement can reduce the air flow resistance of the cooling air being guided toward the negative-electrode side heat radiation fin. Thus, the cooling properties of the rectifying unit can be further improved.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
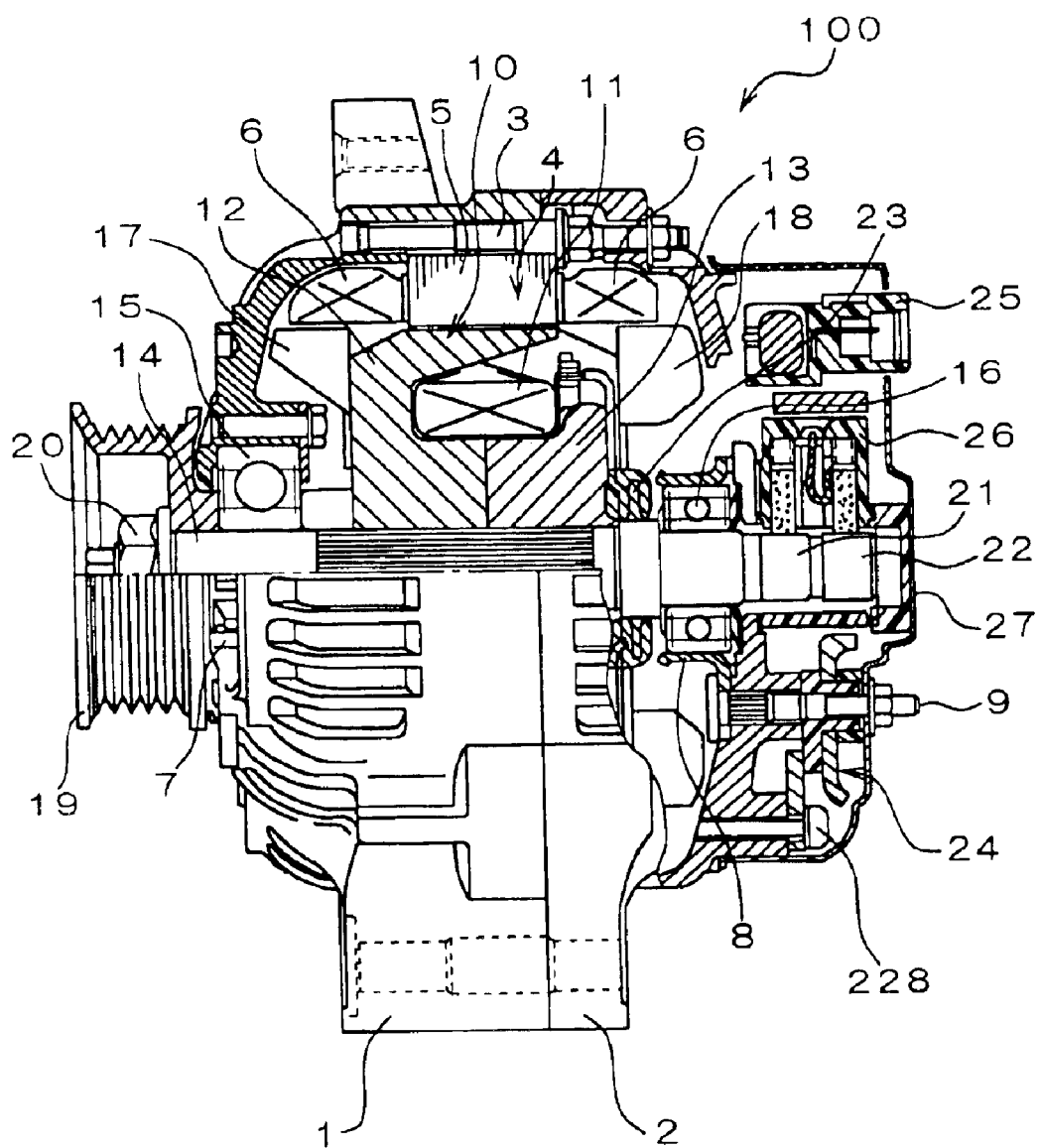
FIG. 1 is a partly cross-sectional view showing an overall arrangement of an automotive alternator in accordance with a referred embodiment of the present invention.

Hereinafter, automotive alternators in accordance with preferred embodiments of the present invention will be explained with reference to the attached drawings. FIG. 1 is a partly cross-sectional view showing an overall arrangement of the automotive alternator in accordance with a referred embodiment of the present invention. An automotive alternator 100 shown in FIG. 1 includes a front frame 1, a rear frame 2, a stator 4, a rotor 10, a rectifying unit 24, a voltage adjuster 25, a brush unit 26, and a rear cover 27.

The front frame 1 and the rear frame 2 are aluminum diecast products and respectively configured into predetermined cup shapes being coupled with each other along their openings and fixed by means of a plurality of bolts 3. The stator 4 is fixed to an inner cylindrical surface of the front frame 1. The stator 4 is composed of a stator core 5, a stator winding 6 and others. Furthermore, a cylindrical bearing box 7 is integrally formed with the front frame 1. A steel bearing box 8 is attached to the rear frame 2 by means of bolts 9 each having a knurl.

The rotor 10 includes a field winding 11, pole cores 12 and 13, and a rotary shaft 14. Two opposed bearings 15 and 16, being fixed to the bearing boxes 7 and 8 respectively, cooperatively support the rotary shaft 14 so as to allow the rotor 10 to rotate freely together with the rotary shaft 14. Two centrifugal cooling fans 17 and 18 are attached to axial end surfaces of the pole cores 12 and 13. The front side cooling fan 17 is a diagonal flow type having a plurality of blades inclined with respect to the rotational direction of the rotor 10 and producing the stream of cooling air supplied to the field winding 11. Furthermore, a pulley 19 is fixed to a front end of the rotary shaft 14 by means of a nut 20. The pulley 19 is entrained via a belt by an output shaft of an automotive engine (not shown) and is accordingly driven by the engine. Two slip rings 21 and 22, provided on a rear end of the rotary shaft 14, are positioned outside the rear frame 2 and are electrically connected to conductors of the field winding 11.

The rectifying unit 24, the voltage adjuster 25, and the brush unit 26, that are collectively referred as electric complements, are fixed to the axial end outer surface of the rear frame 2b by means of bolts 9 or comparable fixing members. The rectifying unit 24 is, for example, rectifies an output voltage (i.e. a three-phase alternating-current voltage) of the three-phase stator winding 6 into a direct-current output voltage. The voltage adjuster 25 adjusts an exciting current flowing in the field winding 11 to control the output voltage of the automotive alternator 100. The brush unit 26 includes two brushes that are forcibly pressed respectively to the slip rings 21 and 22 formed on the rotary shaft 14 of the rotor 10 for supplying the exciting current from the rectifying unit 24 to the field winding 11 of the rotor 10.

These electric components are covered by the steel rear cover 27 that has cooling air inlet windows formed coaxially around the brush unit 26.

Figure 2:
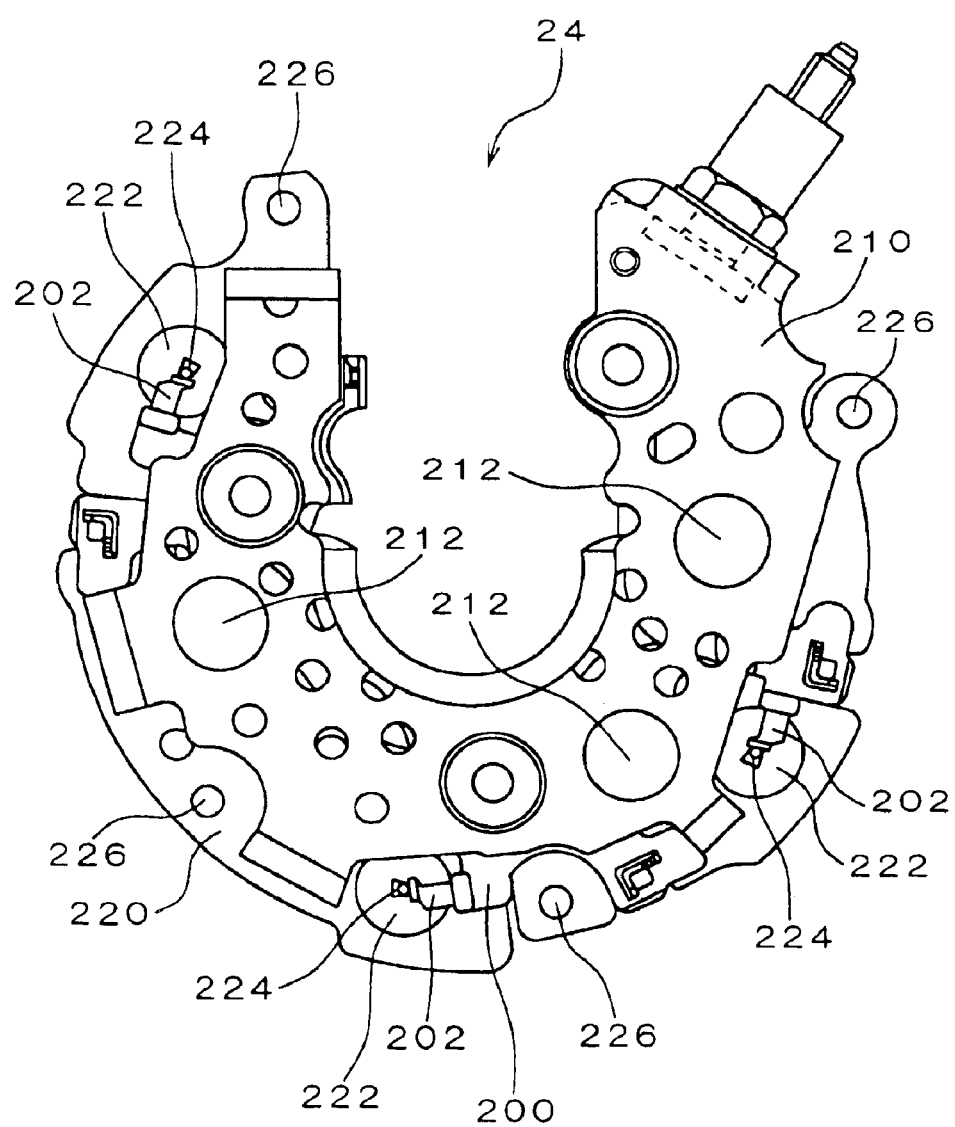
FIG. 2 is a front view showing a rectifying unit in accordance with the referred embodiment of the present invention.
Figure 3:
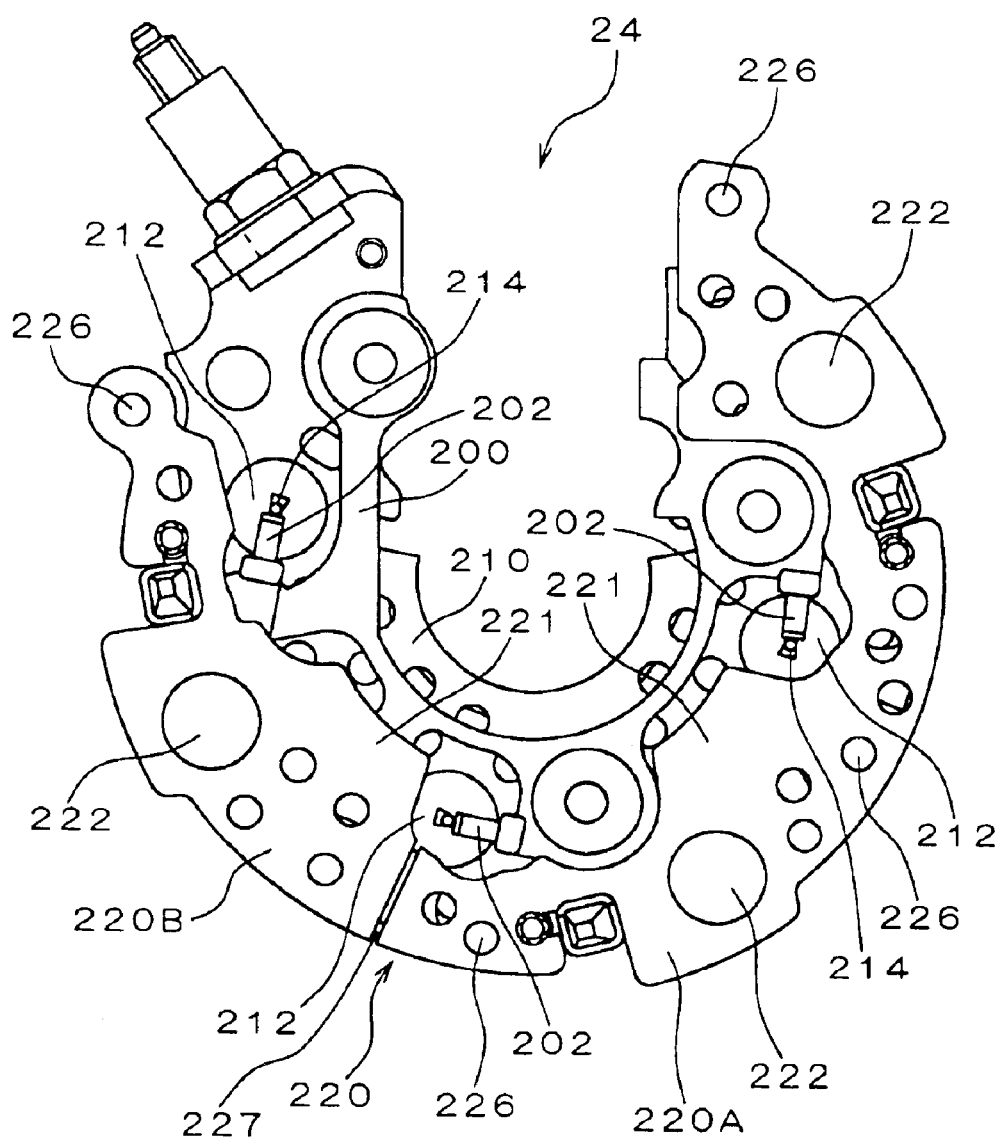
FIG. 3 is a rear view showing the rectifying unit in accordance with the referred embodiment of the present invention.
Figure 4:
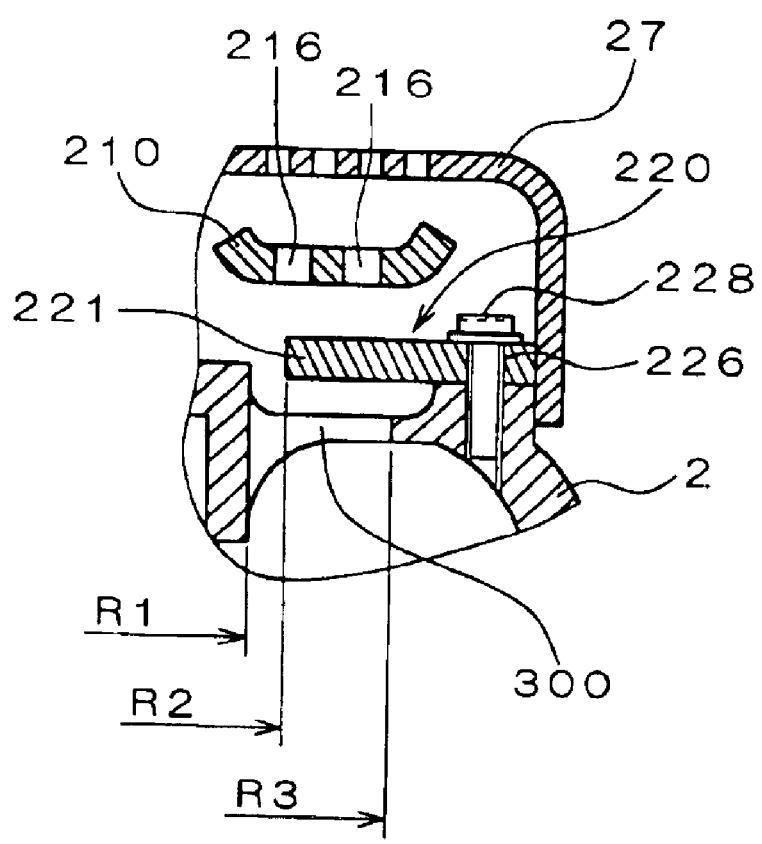
FIG. 4 is a cross-sectional view showing a part of the automotive alternator relating to the rectifying unit in accordance with the referred embodiment of the present invention.

Hereinafter, the rectifying unit 24 will be explained in more detail. FIG. 2 is a front view of the rectifying unit 24. FIG. 3 is a rear view of the rectifying unit 24. FIG. 4 is a cross-sectional view showing a part of the automotive alternator 100 relating to the rectifying unit 24. The rectifying unit 24 includes a positive-electrode side heat radiation fin 210 and a negative-electrode side heat radiation fin 220 laminated in the axial direction so as to be opposed to and spaced from each other with a terminal platform 200 interposing between these heat radiation fins 210 and 220.

The positive-electrode side heat radiation fin 210 is disposed at a rear side with respect to the negative-electrode side heat radiation fin 220 and offset toward the inner side in the radial direction.

The positive-electrode side heat radiation fin 210 has three positive-electrode side rectifying elements 212 being press-fitted into through-holes formed as installation holes with leads 214 extending toward the rear frame 2. Respective leads 214 are connected by TIG welding or the like to wiring connecting terminals 202 protruding from the terminal platform 200. Furthermore, the positive-electrode side heat radiation fin 210 has a plurality of through-holes 216 formed at the inner circumferential side thereof.

The negative-electrode side heat radiation fin 220 is disposed between the positive-electrode side heat radiation fin 210 and the rear frame 2. The negative-electrode side heat radiation fin 220 has three negative-electrode side rectifying elements 222 being press-fitted into through-holes formed ass installation holes with leads 224 extending toward the rear side. Respective leads 224 are connected by TIG welding or the like to wiring connecting terminals 202 protruding from the terminal platform 200. The connecting terminals 202 are wiring components providing the electric connection between the positive-electrode side rectifying elements 212 and the negative-electrode side rectifying elements 222.

Furthermore, the negative-electrode side heat radiation fin 220 is configured into a circular arc shape as a whole having an arc angle equal to or larger than 180 degrees. More specifically, the negative-electrode side heat radiation fin 220 consists of two heat radiation fins 220A and 220B divided by a separation groove 227 formed partly and extending in the radial direction. Furthermore, the negative-electrode side heat radiation fin 220 has a projected portion 221 formed at the rear end surface of the rear frame 2 at the position corresponding to the cooling air inlet window 300. The negative-electrode side heat radiation fin 220 is tightened by means of screws 228 and fixed to the axial end surface of the rear frame 2, at four fixing portions 226 (i.e. through-holes) provided at the outer circumferential side thereof. In other words, the negative-electrode side heat radiation fin 220 is spaced from the rear frame 2 at the entire region except for the portion corresponding to the fixing portions 226.

However, according to the rectifying unit 24 of this embodiment, the projected portion 221 of the negative-electrode side heat radiation fin 220 covers at least a half of the cooling air inlet window 300 formed on the rear end surface of the rear frame 2. As shown in FIG. 4, when R1 and R3 represent the inner radius and the outer radius of the cooling air inlet window 300 formed on the rear frame 2, the radius of a central position of the cooling air inlet window 300 in the radial direction can be expressed by the R1+(R3−R1)/2. Thus, considering the relationship with the inner radius R2 of the projected portion 221 of the negative-electrode side heat radiation fin 220, the dimensions of the negative-electrode side heat radiation fin 220 and the cooling air inlet window 300 are determined so as to satisfy the following equation.

$$R1+(R3-R1)/2 \geq R2$$

Furthermore, the inner circumferential position of the positive-electrode side heat radiation fin 210 formed with the above-described through-holes 216 corresponds to a portion where the projected portion 221 of the negative-electrode side heat radiation fin 220 and the cooling air inlet window 300 are overlapped with each other.

In this manner, the rectifying unit 24 of the automotive alternator 100 in accordance with this embodiment includes the negative-electrode side heat radiation fin 220 covering the cooling air inlet window 300 of the rear frame 2. This arrangement can enlarge the heat radiation area of the negative-electrode side heat radiation fin 220. The cooling air entering from the rear cover 27 can surely cool the negative-electrode side heat radiation fin 220 covering the cooling air inlet window 300. As a result, the cooling properties of the rectifying unit 24 can be improved.

Furthermore, the negative-electrode side heat radiation fin 220 has a projected portion 221 formed along the rotary shaft 14 of the rotor 10 at a position corresponding to the cooling air inlet window 300 so as to protrude toward an inner side in the radial direction. The inner radius of the projected portion 221 is smaller than the outer radius of the cooling air inlet window 300. Forming the projected portion 221 at the portion corresponding to the cooling air inlet window 300 of the rear frame 2 substantially extends the negative-electrode side heat radiation fin 220 toward the inner side in the radial direction. Thus, the cooling properties of the rectifying unit 24 can be adequately maintained and effectively prevented from being worsened by the increase of air flow resistance.

Furthermore, the negative-electrode side heat radiation fin 220 is brought into contact with and fixed to the rear frame 2 via the fixing portion 226 being partly provided. The negative-electrode side heat radiation fin 220 is spaced from the rear frame 2 entirely except for the portion corresponding to the fixing portion 226. Thus, the cooling properties of the rectifying unit 24 can be adequately maintained and effectively prevented from being worsened by the heat conductance from the rear frame 2.

Furthermore, the inner radius R2 of the negative-electrode side heat radiation fin 220 being set to be smaller than the outer radius R3 of the cooling air inlet window 300 is smaller than the radius of the central position of the cooling air inlet window 300 in a radial direction. Widening the area of the negative-electrode side heat radiation fin 220 covering the cooling air inlet window 300 can ensure the effects of improving the cooling properties.

Furthermore, the positive-electrode side heat radiation fin 210 has through-holes 216 positioned along the rotary shaft 14 of the rotor 10 so as to correspond to both of the cooling air inlet window 300 and the negative-electrode side heat radiation fin 220. This arrangement can reduce the air flow resistance of the cooling air flowing toward the negative-electrode side heat radiation fin 220. Thus, the cooling properties of the rectifying unit 24 can be further improved.

Figure 5:
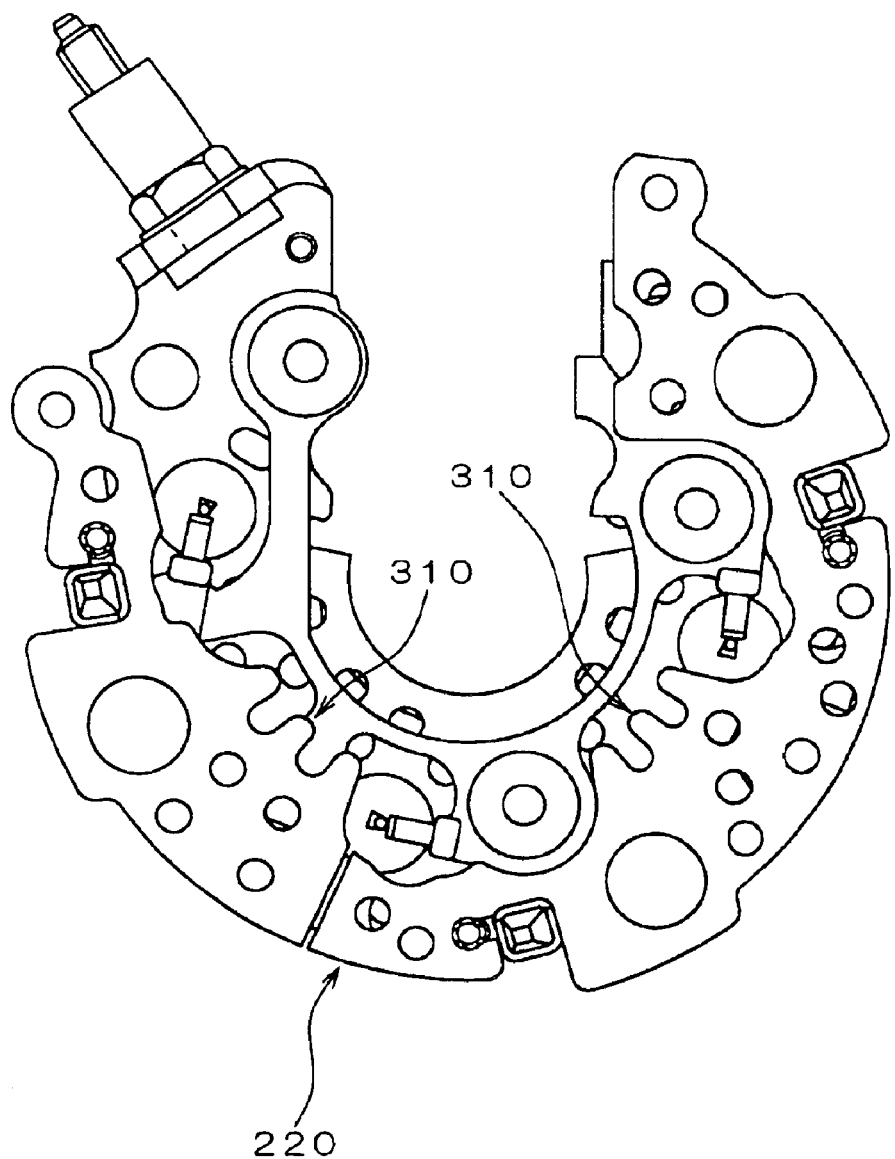
FIG. 5 is a rear view showing a modified embodiment of the rectifying unit in accordance with the referred embodiment of the present invention.
Figure 6:
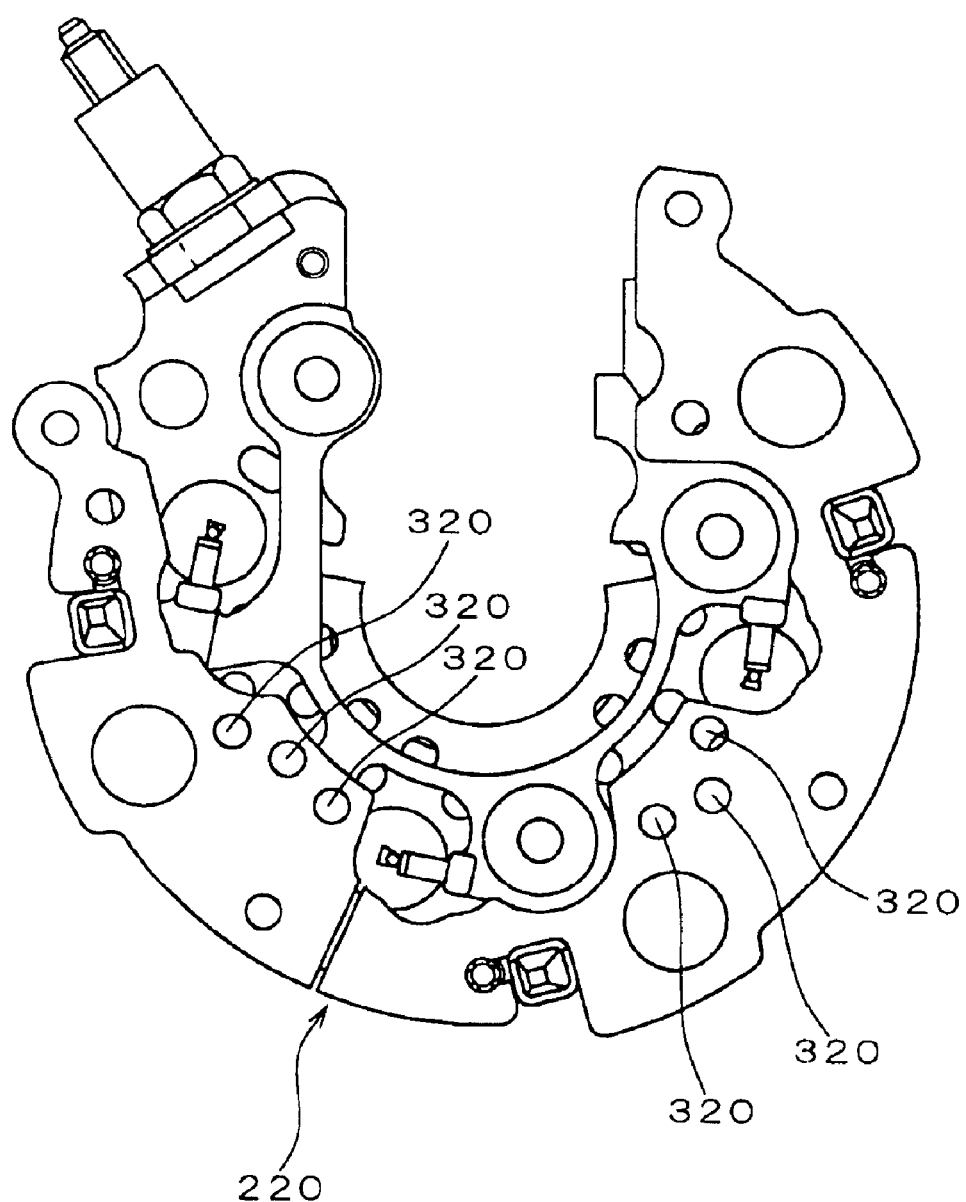
FIG. 6 is a rear view showing another modified embodiment of the rectifying unit in accordance with the referred embodiment of the present invention.

The present invention is not limited to the above-described embodiment and can be modified in various ways within the gist of the present invention. According to the above-described embodiment, the negative-electrode side heat radiation fin 220 overlaps with at least a half of the cooling air inlet window 300 of the rear frame 2. It is however possible to partly modify the negative-electrode side heat radiation fin 220 at the portion where the negative-electrode side heat radiation fin 220 overlaps with the cooling air inlet window 300 of the rear frame 2 so as to further improve the cooling properties. For example, as shown in FIG. 5, it is possible to configure the inner circumferential edge of the negative-electrode side heat radiation fin 220 into an appropriate number of corrugated portions 310 located at a position corresponding to the cooling air inlet window 300 (i.e. the position of the projected portion 221 shown in FIG. 3). Furthermore, as shown in FIG. 6, it is possible to form an appropriate number of through-holes 320 located at the inner circumferential side of the negative-electrode side heat radiation fin 220. The position of these through-holes 320 corresponds to the cooling air inlet window 300. These modified arrangements can increase the substantial surface area of the negative-electrode side heat radiation fin 220 and accordingly can improve the cooling properties of the rectifying unit 24. Furthermore, these arrangements can reduce the air flow resistance and can improve the entire cooling properties of the automotive alternator 100.

What is claimed is:

1. An automotive alternator, comprising:
   a rotor;
   a stator disposed in an opposed relationship with said rotor;
   a frame supporting said rotor and said stator;
   a rectifying unit converting an alternating-current output of said stator into a direct-current output;
   a rear cover disposed outside said frame so as to cover said rectifying unit; and
   a cooling fan introducing cooling air from the outside into an inside space of said frame via said rear cover, said rectifying unit, and a cooling air inlet window of said frame, wherein
   said rectifying unit has a positive-electrode side heat radiation fin to which a positive-electrode side rectifying element is fixed, a negative-electrode side heat radiation fin to which a negative-electrode side rectifying element is fixed, and a terminal platform having a connecting terminal providing wiring for said positive-electrode side rectifying element and said negative-electrode side rectifying element, said positive-electrode side heat radiation fin and said negative-electrode side heat radiation fin are disposed in a radial direction with respect to a rotary shaft of said rotor, said negative-electrode side heat radiation fin is interposed between said frame and said positive-electrode side heat radiation fin and is partly overlapped with said positive-electrode side heat radiation fin in an extending direction of said rotary shaft, said negative-electrode side heat radiation fin has a projected portion at a position overlapping with said cooling air inlet window in the extending direction of the rotary shaft of said rotor so as to protrude toward an inner side of said rotor in the radial direction, said cooling air inlet window has an inner radius R1 and an outer radius R3, and said projected portion has an inner radius R2 so as to satisfy a relationship $R1+(R3-R1)/2 \geq R2 > R1$.

2. The automotive alternator in accordance with claim 1, wherein said negative-electrode side heat radiation fin is brought into contact with and fixed to said frame via a fixing portion being partly provided, and said negative-electrode side heat radiation fin is spaced from said frame except for a portion corresponding to said fixing portion.

3. The automotive alternator in accordance with claim 1, wherein said projected portion of said negative-electrode side heat radiation fin has a through-hole at a position overlapping with said cooling air inlet window in the extending direction of the rotary shaft of said rotor.

4. The automotive alternator in accordance with claim 1, wherein said projected portion of said negative-electrode side heat radiation fin has an inner circumferential edge configured into corrugated portions at a position overlapping with said cooling air inlet window in the extending direction of the rotary shaft of said rotor.

5. The automotive alternator in accordance with claim 1, wherein said positive-electrode side heat radiation fin has a through-hole at a position overlapping with both of said cooling air inlet window and said negative-electrode side heat radiation fin in the extending direction of the rotary shaft of said rotor.

6. The automotive alternator in accordance with claim 1, wherein said positive-electrode side heat radiation fin has a through-hole facing said negative-electrode side heat radiation fin in the extending direction of the rotary shaft of said rotor.

7. The automotive alternator in accordance with claim 1, wherein said projected portion of said negative-electrode side heat radiation fin is positioned so as to be put over said frame through a space in the radial direction.

\* \* \* \* \*